United States Patent
Rodriguez et al.

(10) Patent No.: US 7,574,608 B2
(45) Date of Patent: *Aug. 11, 2009

(54) SECURITY SCREENING OF ELECTRONIC DEVICES BY DEVICE-REPORTED DATA

(75) Inventors: Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 768 days.

This patent is subject to a terminal disclaimer.

(21) Appl. No.: 10/793,622

(22) Filed: Mar. 4, 2004

(65) Prior Publication Data

US 2005/0198513 A1 Sep. 8, 2005

(51) Int. Cl.
 H04K 1/00 (2006.01)
(52) U.S. Cl. ............... 713/182; 340/518; 382/100; 726/26; 726/27; 726/1
(58) Field of Classification Search ......... 713/182, 713/180, 181, 1; 726/34, 26, 27, 1, 2; 382/100; 340/518, 540
See application file for complete search history.

(56) References Cited

U.S. PATENT DOCUMENTS

| | | | |
|---|---|---|---|
| 5,299,116 A | 3/1994 | Owens et al. | |
| 5,367,552 A | 11/1994 | Peschmann | |
| 5,841,350 A * | 11/1998 | Appalucci et al. | 340/572.3 |
| 6,097,301 A | 8/2000 | Tuttle | 340/693.9 |
| 6,218,943 B1 | 4/2001 | Ellenbogen | |
| 6,286,102 B1 * | 9/2001 | Cromer et al. | 726/35 |
| 6,601,190 B1 | 7/2003 | Meyer et al. | 714/37 |
| 6,650,240 B2 | 11/2003 | Lee et al. | 340/572.1 |
| 6,707,879 B2 | 3/2004 | McClelland et al. | |
| 6,721,391 B2 | 4/2004 | McClelland et al. | |
| 6,826,715 B1 * | 11/2004 | Meyer et al. | 714/37 |
| 6,833,787 B1 * | 12/2004 | Levi | 340/539.13 |
| 6,952,163 B2 * | 10/2005 | Huey et al. | 340/521 |
| 7,139,406 B2 | 11/2006 | McClelland et al. | |
| 7,290,287 B2 * | 10/2007 | Rodriguez et al. | 726/27 |
| 2002/0073314 A1 * | 6/2002 | Bhat | 713/167 |

(Continued)

OTHER PUBLICATIONS

Mitch Wagner, IBM Sounds Alarm With Upcoming PCs, Internet Week, 1998, pp. 1.*

(Continued)

*Primary Examiner*—Nasser G Moazzami
*Assistant Examiner*—Shanto M Abedin
(74) *Attorney, Agent, or Firm*—Justin M. Dillon; Amy J. Pattillo (57) ABSTRACT

A device scanner system at a security checkpoint queries a powered on electronic device for device-reported data via a network connection. The device-reported data includes the operational status of at least one component of the electronic device, a configuration of the electronic device, and a current ownership of the electronic device. Responsive to receiving the device-reported data, the device scanner system retrieves expected data for the electronic device. The device scanner system assigns a security level to the electronic device indicating whether the device-reported data matches the expected data, such that the electronic device is screened based on data reported by the powered on electronic device.

5 Claims, 6 Drawing Sheets

U.S. PATENT DOCUMENTS

| | | | |
|---|---|---|---|
| 2002/0186862 A1* | 12/2002 | McClelland et al. | 382/100 |
| 2003/0085163 A1* | 5/2003 | Chan et al. | 209/589 |
| 2003/0225612 A1* | 12/2003 | DeSimone et al. | 705/13 |
| 2004/0255169 A1* | 12/2004 | Little et al. | 713/202 |

OTHER PUBLICATIONS

Electronic Engineering Times, Embedded Processing—Atmel E2PROM Allows Users To Embed Security Features, 1998, pp. 1.*

Rodriguez et al., U.S. Appl. No. 10/718,091, filed Nov. 20, 2003.

Electronic Engineering Times, "Network Spec Released For Everyday Products", Sep. 15, 2003, p. 1.

Internet World, "Keeping Data Safe: Protecting Data On Handheld Devices Helps Keep Confidential Information From Prying Eyes.", vol. 8, Apr. 2002, p. 46-49.

IEEE, "Application of an Explosive Detection Device Based on Quadrupole Resonanace (QR) Technology in Aviation Security", 2001, p. 282-288.

Building Services Journal, "Protection Without Wires", Nov. 1999, p. 28-29.

Electronic Engineering Times, "Embedded Processing—Atmel E2PROM Allows Users to Embed Security Features", May 4, 1998, p. 56.

Internet World, "IBM Sounds Alarm With Upcoming PCs", Apr. 20, 1998, p. 16.

* cited by examiner

SECURITY SCREENING OF ELECTRONIC DEVICES BY DEVICE-REPORTED DATA

BACKGROUND OF THE INVENTION

1. Technical Field

The present invention relates in general to improved security systems and in particular to a method for improving security screening of electronic devices. Still more particularly, the present invention relates to comparing real-time device-reported data from a powered on electronic device with expected data for the device, wherein the electronic device is considered secure if the real-time device-reported data matches the expected data.

2. Description of the Related Art

Providing adequate security is an increasing problem. Airports tend to require advanced security precautions. In particular, more focus is placed on screening all items that travelers will take on board. These advanced security precautions are confounded by the increasing number of electronic devices that travelers desire to take on board. Examples of electronic devices that are gaining in prevalence on flights include, but are not limited to wireless phones, notebook computers, personal digital assistants (PDA)s, voice recorders, MPEG-1 layer 3 (MP3) players, cameras, electric razors, and portable cassette tape, compact disc (CD), or digital video disk (DVD) players.

Current security precautions for checking electronic devices include a standard x-ray scan and a visual examination by a security agent. A standard x-ray scan of an electronic device does not reveal sufficient information to provide the type of security needed in airports. For example, internal components of an electronic device, such as a battery, may be replaced with explosives designed to look like a battery. Further, a visual examination by a security agent to ensure that the electronic device turns on and functions does not reveal sufficient information to provide the type of security needed in airports. For example, an electronic device may include contraband or dangerous materials, but still appear to function.

Another constraint on security precautions is the time involved in checking carry on luggage, and in particular checking electronic devices. Currently, for each electronic device, a scan and an agent check are required.

Thus, it would be advantageous to provide an enhanced screening process that pre-screens electronic devices in a reliable way to narrow down the number of electronic devices that require a hand check. It would be advantageous to receive device-reported data about the electronic device from the powered on electronic device and compare that device-reported data with expected data. In particular, it would be advantageous to receive data about the current operation and configuration characteristics of the electronic device from the powered on electronic device and determine whether the current data matches with expected data for that particular electronic device. In addition, in particular, it would be advantageous to receive current registrant data from the powered on electronic device and determine whether the identity of the person carrying the electronic device matches the current registrant data.

SUMMARY OF THE INVENTION

In view of the foregoing, the present invention provides an improved security system. In particular, the present invention provides improved security screening of electronic devices at security checkpoints. Still, more particularly, the present invention provides for comparing real-time device-reported data from a powered on electronic device with expected data for the device, wherein the electronic device is considered secure if the real-time device-reported data matches the expected data.

According to one embodiment, a powered on electronic device is queried for device-reported data at a security checkpoint via a network connection. Responsive to receiving the device-reported data, the device scanner system retrieves expected data for the electronic device. Then, the device scanner system assigns a security level to the electronic device indicating whether the device-reported data matches the expected data, such that the electronic device is screened based on data reported by the powered on electronic device.

One embodiment of the invention provides security screening of electronic devices at security checkpoints. One embodiment of the invention provides for comparing real-time device-reported data from a powered on electronic device with expected data for the device, wherein the electronic device is considered secure if the real-time device-reported data matches the expected data.

According to one embodiment, a powered on electronic device is queried for device-reported data at a security checkpoint via a network connection. Responsive to receiving the device-reported data, the device scanner system retrieves expected data for the electronic device. The device scanner system assigns a security level to the electronic device indicating whether the device-reported data matches the expected data, such that the electronic device is screened based on data reported by the powered on electronic device.

The device-reported data includes the operational status of at least one component of the electronic device, a configuration of the electronic device, and a current ownership of the electronic device. The expected data may be retrieved from a single or multiple expected-data servers that maintain databases including the expected operation status of components of electronic devices, the expected configuration of electronic devices, and the expected ownership of electronic devices. Manufacturers, employers, or other entities may maintain the expected data.

Expected data is queried according to a device identifier retrieved from the electronic device. In one embodiment, the device identifier is retrieved in the device-reported data. In another embodiment, the device identifier is retrieved from a radio frequency identifier chip that locally broadcasts the device identifier.

The device scanner system also implements an ID scanning system that determines an entity identifier for the entity personally associated with the electronic device at the device checkpoint. That entity may be an individual, an employer, a group, or other designator. The entity identifier is compared by the device scanner system with the device-reported ownership data or expected ownership data to determine if the entity identifier matches.

The device scanner system controls a display of the security level of an electronic device. An indicator of the security level and instructions for responding to the security level may be displayed in a graphical display interface.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
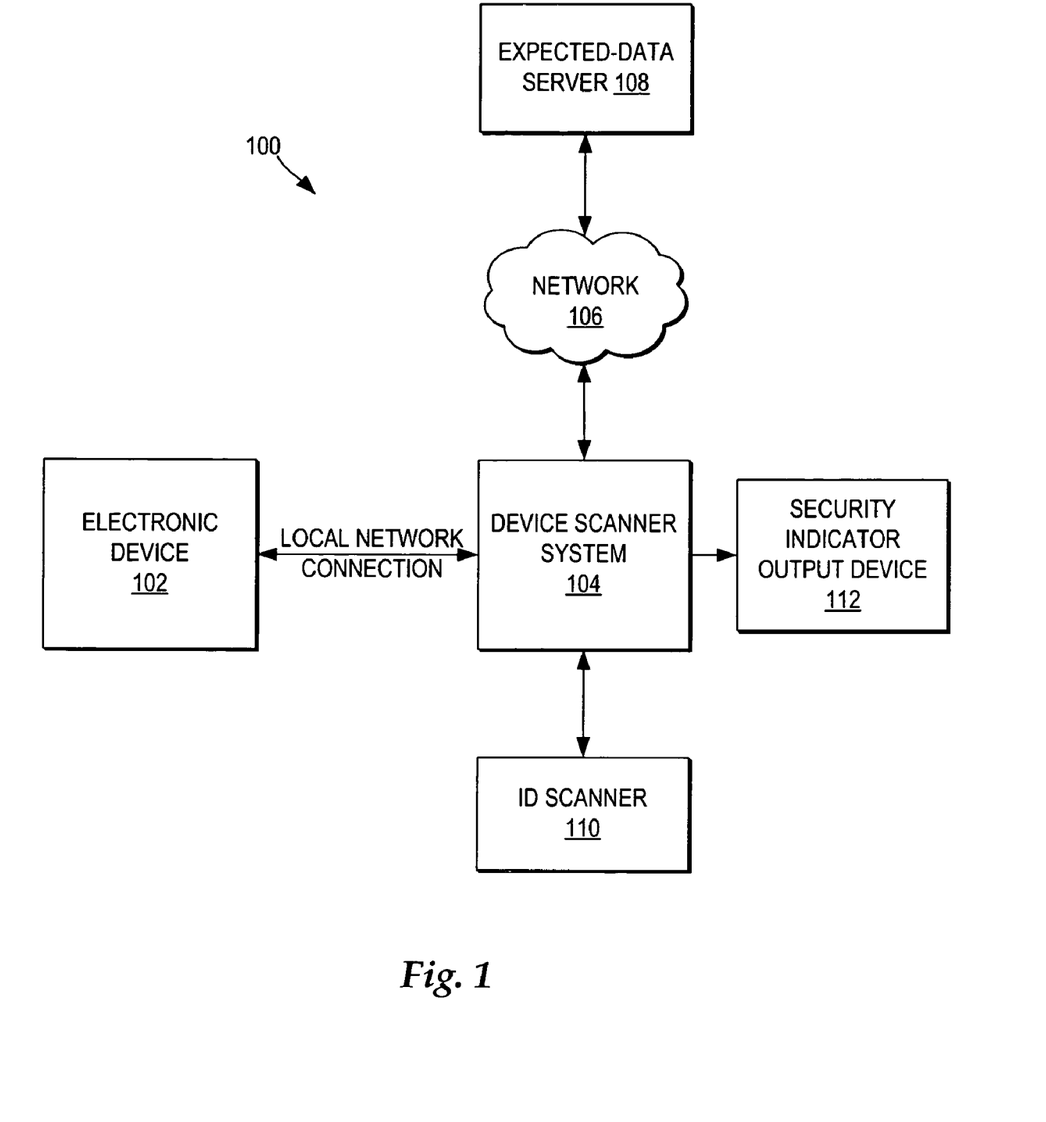
FIG. 1 depicts one embodiment of a security system for accessing device-reported data from a powered on electronic device and determining whether the device-reported data is consistent the expected data for the powered on electronic device.

With reference now to the drawings, and in particular to FIG. 1, there is illustrated one embodiment of a security system for accessing device-reported data from a powered on electronic device and determining whether the device-reported data is consistent with the expected data for the powered on electronic device. As depicted, a device scanner system 104 queries a powered on electronic device 102 for device-reported data via a local network connection. The local network connection may include, but is not limited to, an infrared connection, a Bluetooth enabled connection, a WiFi connection, or a wired local connection. It will be understood that while the present invention is described with reference to a local network connection between device scanner system 104 and electronic device 102, that other types of connections may be implemented.

In one embodiment, device scanner system 104 is part of a security checkpoint, such as an airport security checkpoint. Further, device scanner system 104 may be implemented within a checkpoint scanning system where electronic devices are scanned by an x-ray or other system that scans the internal components of the electronic devices.

The device-reported data may include current configuration and component operation of the electronic device. A security agent application executing within electronic device 102 may implement a diagnostic analysis of the current configuration and component operation. For example, the security agent application may capture the processor frequency or the memory speed. In another example, the security agent application may capture the current ownership data for the electronic device.

The device-reported data may also include a device identifier for electronic device 102. Alternatively, device scanner system 104 may scan a radio frequency identifier (RFID) chip affixed to an electronic device 102 to acquire the device identifier. Although not depicted, the RFID chip may be implemented in a small memory module interfacing with a passive RF antenna. The RF antenna is designed to read the RFID data from the memory module using energy generated by the RF field from an RF reader. Thus, advantageously, the RFID of an electronic device can be read even when the electronic device is not powered on. It will be understood that other methods of detecting a device identifier for electronic device 102 may also be implemented.

Device scanner system 104 then queries an expected-data server 108 via a network 106 for expected data for the electronic device identifier. Network 106 may include internets, intranets, and the Internet.

Expected-data server 108 preferably searches a database of expected operational characteristics and configuration data according to the identifier. In one embodiment, device scanner system 104 may pass the device-reported data to expected-data server 108 so that electronic device 102 can determine whether the device-reported data matches the expected data for electronic device 102. In an alternate embodiment, expected-data server 108 returns the expected data to device scanner system 104 so that device scanner system 104 can determine whether the device-reported data matches the expected data.

The device-reported data received from electronic device 102 may also include ownership data identifying a person or other entity to which electronic device 102 is registered. In addition, the expected data retrieved from expected-data server 108 may include expected ownership data which identifies a person or other entity to which electronic device 102 is registered.

Device scanner system 104 may compare the ownership data with an entity identifier for the current entity associated with electronic device 102 at the security checkpoint. The entity may include an individual, a business, an organization, or other group identifier. In one example, device scanner system 104 receives the entity identifier for the current entity associated with electronic device 102 from ID scanner 110. In the example, ID scanner 110 scans a ticket, boarding pass, plastic id, electronic identifier, or other item that indicates the identity of the entity associated with electronic device 102 at the security checkpoint. Further, ID scanner 110 may scan for biometric data where the entity is an individual.

Overall, device scanner system 104 preferably determines whether the device-reported data from electronic device 102 is consistent with the expected data for electronic device 102 and the current identification data and outputs an indicator of the consistency via security indicator output device 112. Security indicator output device 112 may include a display screen, colored lights, or other type of output interface. Consistency may be indicated as a yes/no, a percentage, a star rating, or other form of indicating the results of comparing the current operational data with expected data.

In another embodiment of the invention, the device-reported data from electronic device 102 may also include encrypted expected data. Expected-data server 108 then provides a public key to device scanner system 104 to decrypt the encrypted expected data received from electronic device 102. It will be understood that in addition to encrypting expected data, other types of data sent from electronic device 102 and expected-data server 108 may be encrypted. Further, it will be understood that multiple types of data security and encryption may be implemented.

It is important to note that the systems implemented within security system 100 may be implemented as a distributed network system. In a distributed network system, multiple networks may provide a medium for communication links among the various devices within security system 100. Networks, such as network 106, may include permanent connections, such as wire or fiber optics cables, temporary connections made through telephone connections, and wireless transmission connections. Further, networks, such as network 106, provide an infrastructure for transmitting communications between systems. The network infrastructure may implement multiple protocol layers, including secure socket layers (SSL).

While expected-data server 108 is depicted as a single server system, in alternate embodiments, expected-data server 108 may be distributed across multiple server systems. Further, different manufacturers, employers, or other entities may each maintain data within expected-data servers, such as expected-data server 108. Moreover, mirrored copies of the database in expected-data server 108 may be placed in multiple servers accessible to multiple security systems.

Alternatively, it is important to note that systems implemented within security system 100 may be stand-alone systems, not connected to a network, with secure channels connecting each of the systems. In particular, when implemented as a stand-alone system, expected-data server 108 may receive weekly or daily updates of expected data from a temporary network connection or a portable storage device.

When establishing communication channels among the components of security system 100, different levels of authentication and security within the communications may be implemented. In particular, electronic device 102 may require authentication of device scanner system 104 as an authorized scanning system before transmitting the device-reported data to device scanner system 104. In another example, the expected data sent by expected-data server 108 may be sent in encrypted packets to device scanner system 104.

Figure 2:
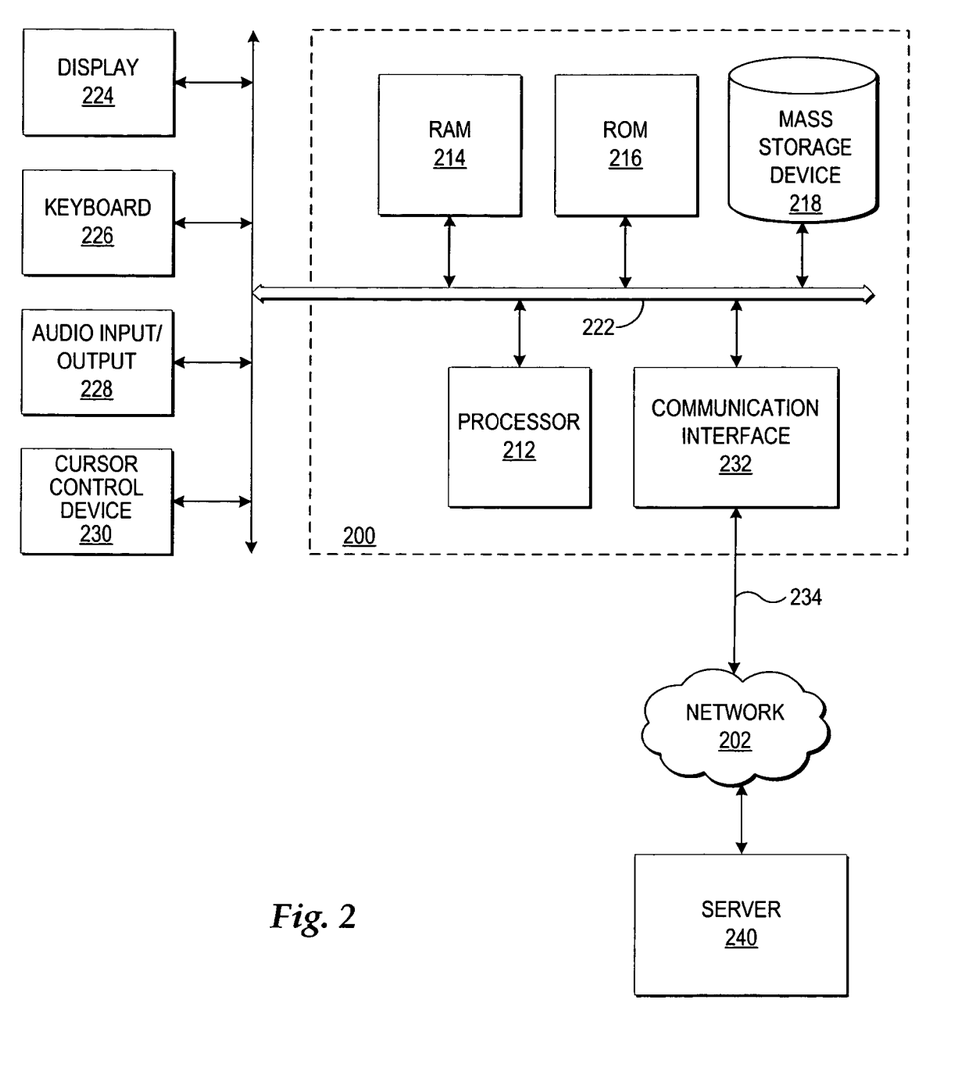
FIG. 2 depicts one embodiment of a computer system which may implement the present invention.

Referring now to FIG. 2, there is depicted one embodiment of a computer system which may implement the present invention. The present invention may be executed in a variety of systems, including a variety of computing systems under a number of different operating systems. In general, the present invention is executed in a computer system that performs computing tasks such as manipulating data in storage that is accessible to, the computer system. In addition, the computer system includes at least one output device and at least one input device. Further, the computer system may be further classified as an electronic device, a scanner, a server, or other system, configured to perform particular processes and functions.

In general, computer system 200 includes a bus 222 or other communication device for communicating information within computer system 200, and at least one processing device such as processor 212, coupled to bus 222 for processing information. Bus 222 preferably includes low-latency and higher latency paths that are connected by bridges and adapters and controlled within computer system 200 by multiple bus controllers. When implemented as a server system, computer system 200 typically includes multiple processors designed to improve network servicing power.

Processor 212 may be a general-purpose processor such as IBM's PowerPC™ processor that, during normal operation, processes data under the control of operating system and application software accessible from a dynamic storage device such as random access memory (RAM) 214 and a static storage device such as Read Only Memory (ROM) 216. The operating system preferably provides a graphical user interface (GUI) to the user. In a preferred embodiment, application software contains machine executable instructions that when executed on processor 212 carry out the operations depicted in the flowcharts of FIGS. 6, 7, and other operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium (or computer operable medium) having stored thereon the machine executable instructions (or program code) used to program computer system 200 to perform a process according to the present invention. The terms "machine-readable medium" and "computer operable medium" as used herein, include any medium that participates in providing instructions to processor 212 or other components of computer system 200 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 200 can read and which is suitable for storing instructions. In the present embodiment, an example of a non-volatile medium is mass storage device 218 which as depicted is an internal component of computer system 200, but may be understood to also be provided by an external device. Volatile media include dynamic memory such as RAM 214. Transmission media include coaxial cables, copper wire or fiber optics, including the wires that comprise bus 222. Transmission media can also take the form of acoustic, electromagnetic, or light waves, such as those generated during radio frequency or infrared data communications.

Moreover, the present invention may be downloaded as a computer program product, wherein the program instructions may be transferred from a remote computer such as a server 240 to requesting computer system 200 by way of data signals embodied in a carrier wave or other propagation medium via a network link 234 (e.g. a modem or network connection) to a communications interface 232 coupled to bus 222. Communications interface 232 provides a two-way data communications coupling to network link 234 that may be connected, for example, to a local area network (LAN), wide area network (WAN), or directly to an Internet Service Provider (ISP). In particular, network link 234 may provide wired and/or wireless network communications to one or more networks.

Network link 234 provides data communication services through network 202. Network 202 may refer to the worldwide collection of networks and gateways that use a particular protocol, such as Transmission Control Protocol (TCP) and Internet Protocol (IP), to communicate with one another. Network link 234 and network 202 both use electrical, electromagnetic, or optical signals that carry digital data streams. The signals through the various networks and the signals on network link 234 and through communication interface 232, which carry the digital data to and from computer system 200, are exemplary forms of carrier waves transporting the information.

When implemented as a server system, computer system 200 typically includes multiple communication interfaces accessible via multiple peripheral component interconnect (PCI) bus bridges connected to an input/output controller. In this, manner, computer system 200 allows connections to multiple computers via network 202.

When implemented as a portable electronic device, computer system 200 typically also includes a battery for providing power to the components of computer system 200. Further, when implemented as a portable electronic device, computer system 200 may not include all the components illustrated due to the compact nature of many electronic devices.

Further, multiple peripheral components may be added to computer system 200, connected to multiple controllers, adapters, and expansion slots coupled to one of the multiple levels of bus 222. For example, an audio input/output (I/O) device 228 is connectively enabled on bus 222 for controlling audio input through a microphone or other sound or lip motion capturing device and for controlling audio output through a speaker or other audio projection devices. A display 224 is also connectively enabled on bus 222 for providing visual, tactile or other graphical representation formats. A keyboard 226 and a cursor control device 230, such as a mouse, trackball, or cursor direction keys, are connectively enabled on bus 222 as interfaces for user inputs to computer system 200. In alternate embodiments of the present invention, additional input and output peripheral components may be added. In particular, as will be further described, when computer system 200 is implemented as an x-ray scanning system, an RFID reader is preferably included as an additional peripheral component for detecting RFIDs from electronic devices.

Those of ordinary skill in the art will appreciate that the hardware depicted in FIG. 2 may vary. Furthermore, those of ordinary skill in the art will appreciate that the depicted example is not meant to imply architectural imitations with respect to the present invention.

Figure 3:
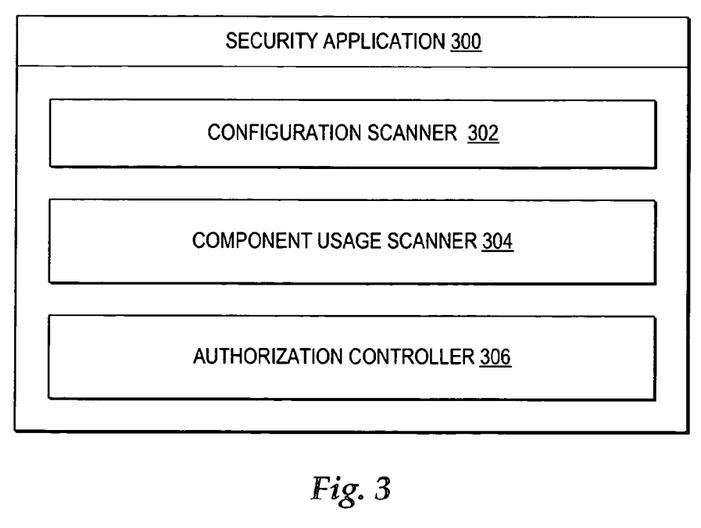
FIG. 3 depicts a block diagram of a security application for providing device reported data at a security checkpoint.

Referring now to FIG. 3, there is depicted a block diagram of a security application for providing device-reported data at a security checkpoint. As depicted, security application 300, which in one embodiment executes within electronic device 102, may include multiple components for gathering device-reported data and communicating the device-reported data. In particular, security application 300 preferably includes diagnostic tools for scanning the configuration and utilization of electronic device 102. In particular, a configuration scanner 302 preferably scans electronic device 102 for information about the device configuration and ownership. A component usage scanner 304 preferably scans electronic device 102 to monitor and gather current component utilization data. For example, the processor frequency, memory speed, bus speed, and other component utilization statistics may be gathered.

An electronic device may trigger security application 300 when a request for device-reported data is received from device scanner system 104 at a security checkpoint. Configuration scanner 302 and component usage scanner 304, however, may automatically periodically monitor the configuration, ownership, and component utilization when electronic device 102 is powered on. Prior to enabling transmission of the device-reported data to device scanner system 104, an authorization controller 306 may establishes a secure communication channel with device scanner system 104 and require authentication of the access rights of device scanner system 104.

Figure 4:
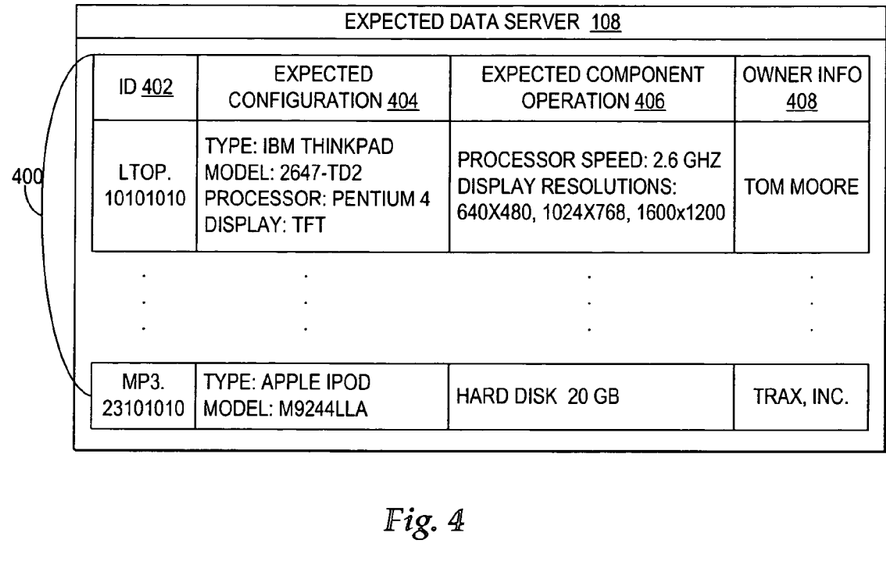
FIG. 4 depicts an illustrative representation of examples of expected data accessible from an expected-data server.

With reference now to FIG. 4, there is depicted an illustrative representation of examples of expected data accessible from an expected-data server. As illustrated, a database 400 includes the following data types: ID 402, an expected configuration 404, an expected component operation 406, and expected ownership information (OWNER INFO) 408. An electronic device ID 402 may include an alphanumeric identifier of the manufacturer, the distributor, and the device, for example. Expected configuration 404 may include the expected types of components, model numbers of expected components, and other identification of expected components. Expected component operation 406 may include the expected operational characteristics of components of the electronic device. Finally, expected ownership information 408 may include the current registration information for an electronic device, including an identifier for at least one entity asserting ownership of the electronic device. It is important to note that the information provided in database 400 may be distributed across multiple databases and server systems. For example, expected ownership information 408 may be accessible via a registration information database maintained independent of the expected operational characteristics of components of the electronic device. Further, expected ownership information 408 may be updated if an electronic device is designated as stolen or lost such that when the electronic device expected data is requested by electronic device ID, the electronic device is designated as stolen and can be quickly recovered.

In the example, a first entry includes expected data for a laptop with a device identifier "LTOP.10101010". In the example, the expected configuration indicates the type of system, the model number, the processor type, and the display type. The expected component operation indicates an expected processor speed and expected display resolutions. Finally, the expected ownership information indicates an individual registered in associated with the device.

In addition, in the example, a second entry includes expected data for an mp3 player with a device identifier "MP3.23101010". In the example, the expected configuration indicates the type of system and model number. The expected component operation indicates the expected hard disk size. The expected ownership indicates a business registered in associated with the device. It will be understood that in addition to the examples depicted in FIG. 4, other types of expected configuration information, expected component operation information, and ownership information may be included in database 400.

Figure 5:
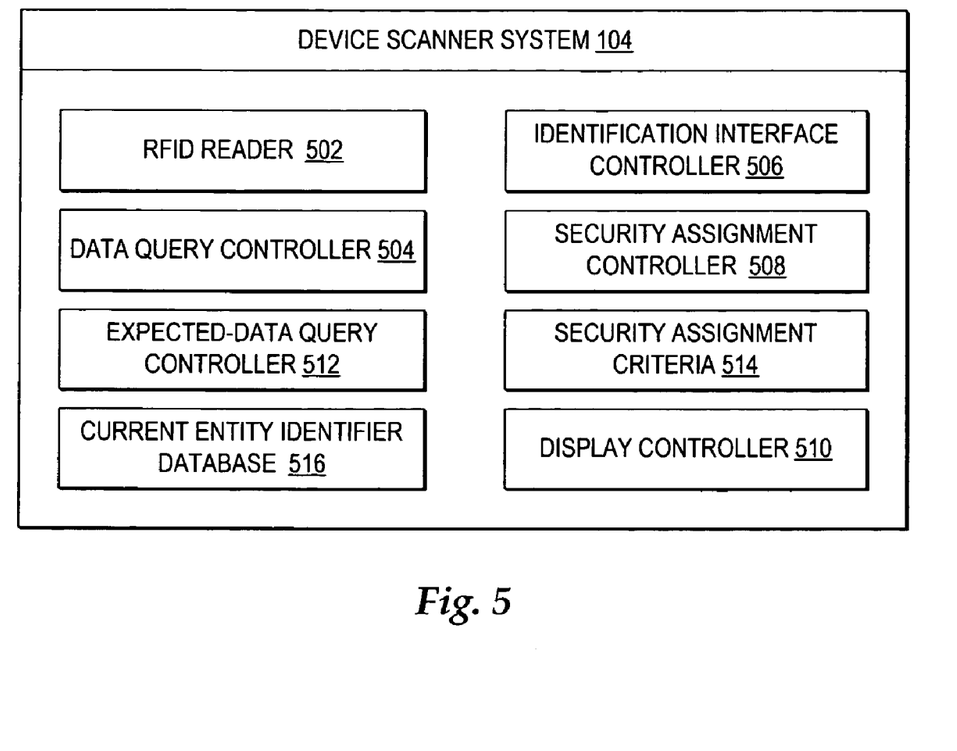
FIG. 5 depicts a block diagram of one embodiment of a device scanner system in accordance with the method, system, and program of the present invention.

Referring now to FIG. 5, there is depicted a block diagram of one embodiment of a device scanner system in accordance with the method, system, and program of the present invention. It will be understood that device scanner system 104 may be distributed across multiple systems and may implement multiple peripheral interfaces.

Device scanner system 104 may include a data query controller 504. Data query controller 504 preferably establishes a local communication channel with electronic devices and requests device-reported data from those electronic devices. In particular data query controller 504 may establish a secure communication channel with electronic devices.

Device scanner system 104 preferably retrieves a device identifier for each electronic device. The device identifier may be included in the device-reported data retrieved by data query controller 504. Alternatively, a device identifier for an electronic device may be gathered by an RFID reader 502. RFID reader 502 preferably reads device identifiers from RFIDs attached to electronic devices. Alternatively, device scanner system 104 may include bar code and other types of device identification tag scanners. Further, RFID reader 502 may read ownership information from RFIDS sattached to electronic device.

In addition, device scanner system 104 may include an identification interface controller 506. Identification interface controller 506 preferably interfaces with an ID scanner, such as ID scanner 110 depicted in FIG. 1, to retrieve entity identifiers for comparison with the expected ownership information and device-reported ownership information.

An expected-data query controller 512 queries an expected-data server for the expected data of an electronic device. The expected data may include expected ranges of operation for components of the electronic device, expected configuration data, and expected ownership information.

Security assignment controller 508 will compare the expected data with the operational data retrieved by data query controller 504 and entity identification retrieved by identification interface controller 506. Security assignment controller 508 may assign a security level based on the types of data matches with the expected data. For example, security assignment controller 508 may assign a security level indicating that only 50% of the data matches the expected data.

In particular, security assignment controller 508 further assigns the security level based on security assignment criteria 514. Security assignment criteria 514 may specify which security levels should be assigned to particular types of data mismatches. Security assignment criteria 514 may be further specified by the type of electronic device, type of manufacturer of the electronic device, place of origin of the electronic device, travel history of the electronic device, and other criteria.

Based on the security level assigned to an electronic device, display controller 510 controls an output indicating the security level. For example, display controller 510 may control the output of a security level by a color indicator, a number, a word, a sound, or other indicator. In addition to indicating the security level, display controller 510 may provide instructions for how security personnel are to respond to the security level.

In one example, if the ownership information reported in the device-reported data does not match the expected ownership information or the entity identity of the person associated with the electronic device at the security checkpoint, then the security level indicates an ownership mismatch. In another example, if the processor frequency in the device-reported data for an electronic device is not within the operational range designated for that electronic device in the expected data, then the security level indicates a hardware component mismatch.

In addition, a current entity identifier database 516 preferably maintains a list of the current entities identified within a security checkpoint area. Security assignment controller 508 preferably determines whether there is a match between the ownership of each electronic device detected in the security checkpoint area and the current entity identifiers. If there is not a match, then display controller 510 will display an alert as to the electronic device without an ownership matching any of the entities within the security checkpoint area.

Figure 6:
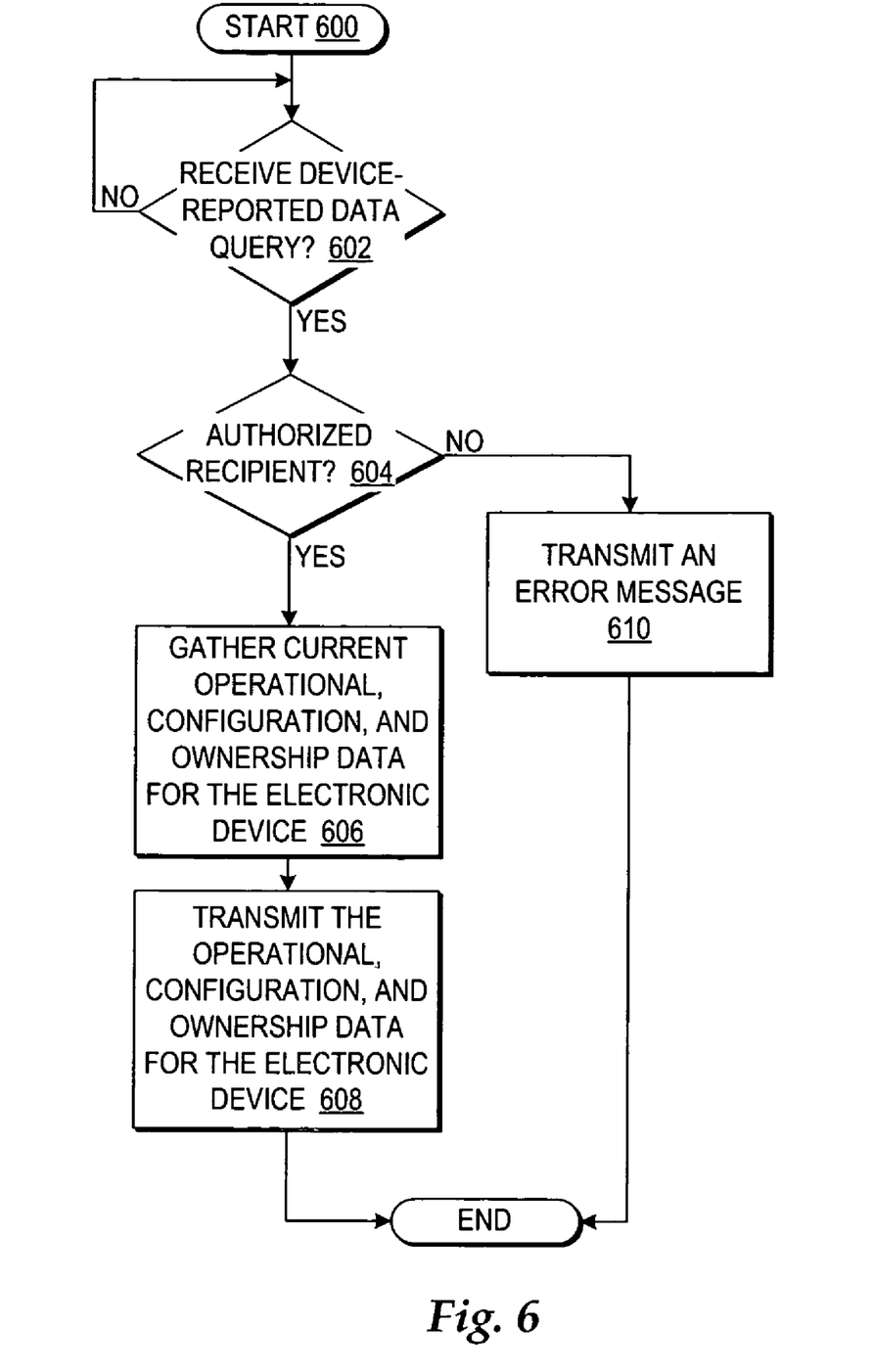
FIG. 6 depicts a high level logic flowchart of a process and program for controlling transmission of device-reported data from a powered on electronic device.

With reference now to FIG. 6, there is depicted a high level logic flowchart of a process and program for controlling transmission of device-reported data from a powered on electronic device. In one embodiment, the process depicted in FIG. 6 executes in a powered on electronic device. As depicted, the process starts at block 600 and thereafter proceeds to block 602. Block 602 depicts a determination whether a device-reported data query is received. If a device-reported data query is not received, then the process iterates at block 602. Once a device-reported data query is received, then the process passes to block 604. Block 604 depicts a determination whether the query is from an authorized recipient. If the query is not from an authorized recipient, then the process passes to block 610. Block 610 depicts transmitting an error message to the querying system, and the process ends. Otherwise, at block 604, if the process is from an authorized recipient, then the process passes to block 606. Block 606 depicts gathering current operational, configuration, and ownership data for the electronic device. For example, the processor frequency or memory speed may be tested and gathered and reported as operational data for the electronic device. Next, block 608 depicts transmitting the operational, configuration, and ownership data for the electronic device as device-reported data to the querying system, and the process ends.

Figure 7:
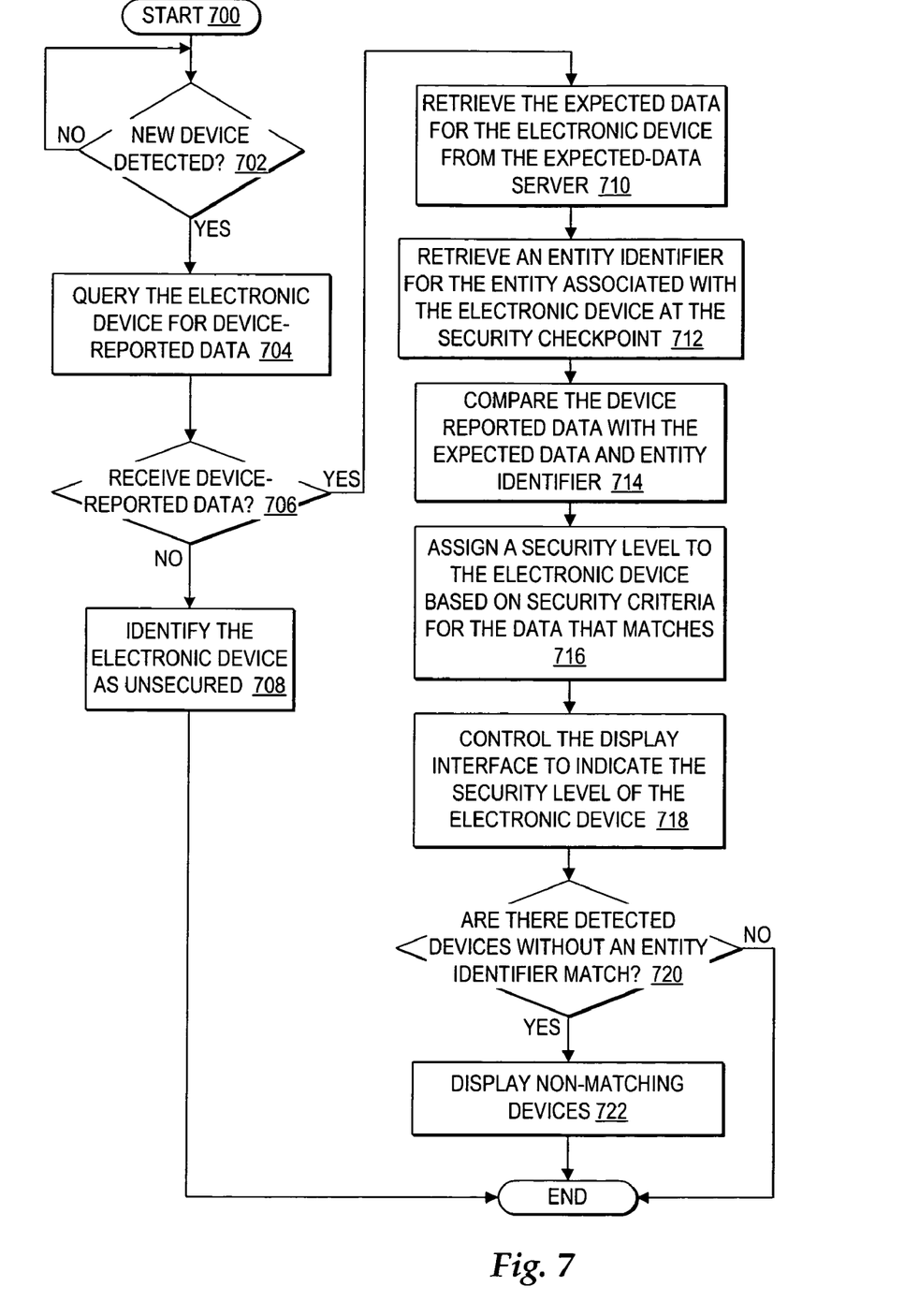
FIG. 7 depicts a high level logic flowchart of a process and program for assessing the security risk of an electronic device by whether the current data matches expected data.

Referring now to FIG. 7, there is depicted a high level logic flowchart of a process and program for assessing the security risk of an electronic device by whether the current data matches expected data. In one embodiment, the process depicted in FIG. 7, executes in a device scanner system. As depicted, the process starts at block 700 and thereafter proceeds to block 702. Block 702 depicts a determination whether a new device is detected. If a new device is not detected then the process iterates at block 702. If a new device is detected, then the process passes to block 704. Block 704 depicts querying the electronic device for device-reported data. In addition, although not depicted, an authorization code or other identifier may be passed to the electronic device. Next, block 706 depicts a determination whether device-reported data is received. If device-reported data is not received, then the process passes to block 708. If device-reported data is received, then the process passes to block 710. Block 710 depicts retrieving the expected data for the electronic device from the expected-data server. Next, block 712 depicts retrieving an entity identifier for the entity associated with the electronic device at the security checkpoint. Thereafter, block 714 depicts comparing the device-reported data with the expected data and entity identifier. Next, block 716 depicts assigning a security level to the electronic device based on the security criteria for the portions of the data that match. Then, block 718 depicts controlling the display or other output interface to indicate the security level of the electronic device. Further, block 720 depicts a determination whether there are detected devices without an entity identifier match. If all detected devices match an entity identifier of an entity at the checkpoint, then the process ends. If there are detected devices without an entity identifier match, then the process passes to block 722. Block 722 depicts displaying the non-matching devices, and the process ends.

Figure 8:
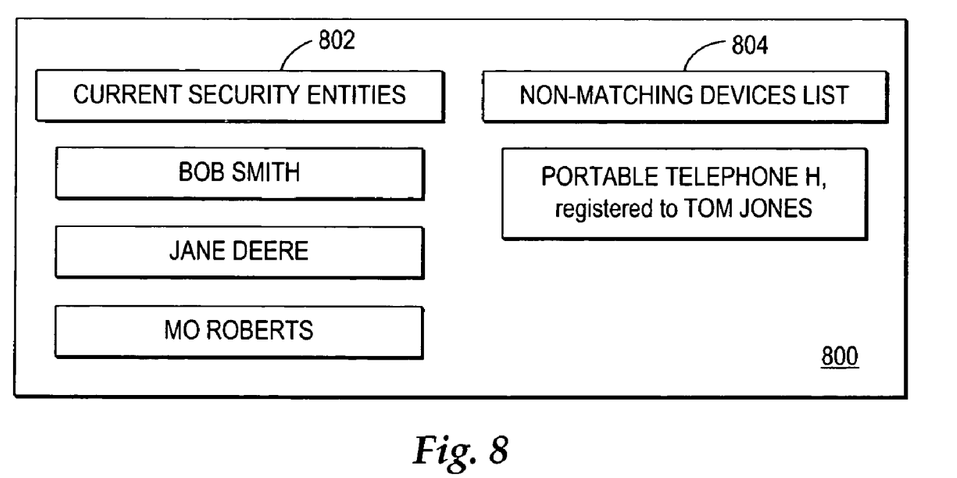
FIG. 8 depicts an illustrative representation of a display interface for aiding security personnel in monitoring whether electronic devices passing through a security checkpoint are registered to the individuals passing through a security checkpoint.

With reference now to FIG. 8, there is depicted an illustrative representation of a display interface for aiding security personnel in monitoring whether electronic devices passing through a security checkpoint are registered to the individuals passing through a security checkpoint. As depicted, a display interface 800 includes lists of current, security entities 802 and non-matching devices list 804. As individuals or parcels pass through a security checkpoint, an entity identifier for the individual or other entity is ascertained. In display area 800, the entity identifiers are depicted as the names of individuals passing through a checkpoint for purposes of example. In addition, as individuals pass through a checkpoint, electronic devices associated with individuals are scanned for a device identity. Then, expected ownership information is preferably accessed for each electronic device according to device identity from expected-data server 108. If the expected ownership information does not match one of the entity identifiers listed in current security entities 802, then the electronic device is listed in non-matching devices list 804. The graphical display of non-matching devices may be further adjusted to indicate the security level determined for each of the non-matching devices.

While the invention has been particularly shown and described with reference to a preferred embodiment, it will be understood by those skilled in the art that various changes in form and detail may be made therein without departing from the spirit and scope of the invention.

What is claimed is:

1. A method for security screening of electronic devices, comprising:

querying a powered on electronic device for real-time device-reported data from a security agent application executing on the electronic device at a security checkpoint and monitoring an operational status of at least one component within said electronic device over a local network connection, wherein said real-time device-reported data comprises scanned current component utilization data for said at least one component of said electronic device as monitored by said security agent application, comprises a configuration of said electronic device, and comprises an identifier of a current owner of said electronic device;

responsive to receiving said real-time device-reported data, retrieving expected data for said electronic device over a network from a server comprising a plurality of records of an expected configuration, an expected component operation, and an expected owner;

detecting an identity of a person associated with said electronic device through an identifier scanner at said security checkpoint;

assigning a security level to said electronic device indicating whether scanned current component utilization data for at least one component matches said expected data and whether said current owner of said electronic device matches said expected data and matches said identity of said person associated with said electronic device, such that said electronic device is screened based on data reported by said electronic device; and outputting said security level at a security indicator output device.

2. The method according to claim 1 for security screening of electronic devices wherein retrieving expected data for said electronic device further comprises:

querying said server via a network for said expected data based on a device identifier for said electronic device.

3. The method according to claim 1 for security screening of electronic devices further comprising:

detecting a device identifier from a radio frequency transmitter affixed to said electronic device; and retrieving said expected data from said server based on said identifier.

4. The method according to claim 1 for security screening of electronic devices wherein detecting an identity of a person associated with said electronic device through an identifier scanner at said security checkpoint further comprises:

detecting, by a identifier scanner device from a ticket presented by said person, said identity of said person associated with said electronic device.

5. The method according to claim 1 for security screening of electronic devices further comprising:

capturing, by said security agent application, an actual processor frequency for a processor operating within said electronic device for reporting in said real-time device-reported data.

* * * * *